(No Model.)

G. M. HERRICK.
SELF ADJUSTING COUNTER BALANCE.

No. 414,642. Patented Nov. 5, 1889.

WITNESSES:
C. E. Norton
A. E. Colby.

INVENTOR
George M. Herrick
BY Almon Robinson
his ATTORNEY.

UNITED STATES PATENT OFFICE.

GEORGE M. HERRICK, OF GREENWOOD, MAINE.

SELF-ADJUSTING COUNTER-BALANCE.

SPECIFICATION forming part of Letters Patent No. 414,642, dated November 5, 1889.

Application filed April 13, 1889. Serial No. 307,207. (No model.)

*To all whom it may concern:*

Be it known that I, GEORGE M. HERRICK, a citizen of the United States, residing at Greenwood, in the county of Oxford and State of Maine, have invented a new and useful Self-Adjusting Counter-Balance, of which the following is a specification.

In the construction of machines which have rapidly-revolving parts it is necessary to carefully counterbalance pieces of irregular shape, and when these pieces are tool-holders or for any other reason require frequent changes and adjustments the unavoidable disturbance of the balance becomes very troublesome.

The object of my invention is to provide a device which shall automatically compensate within predetermined limits any irregularities in the balance.

In carrying out my invention I make use of the combinations shown in the accompanying drawings, in which—

Figure 1:
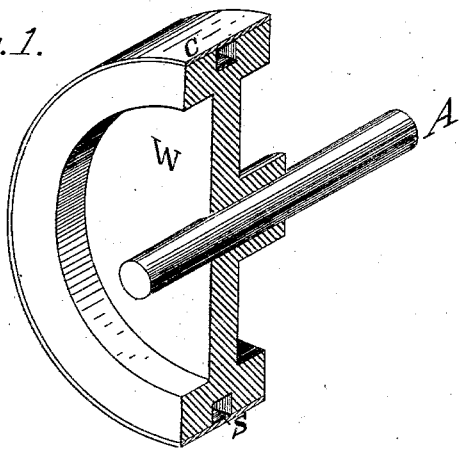
Figure 1 is a sectional elevation of a heavy-rimmed wheel W mounted upon a shaft A. In the rim of this wheel a groove S is turned, which is covered by the close-fitting ring C.
Figure 2:
Fig. 2 represents hard and smooth metallic balls b, which fit loosely in the groove S.
Figure 3:
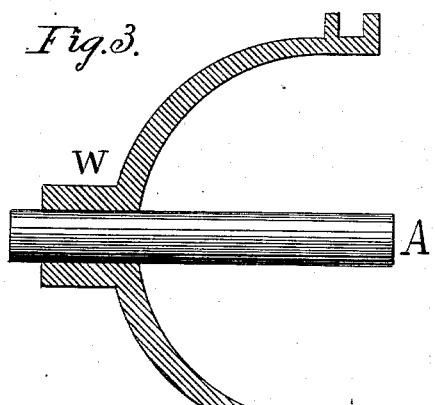
Fig. 3 is a sectional elevation of a bowl-shaped wheel intended to project over the piece to be balanced.
Figures 4, 5, 6:
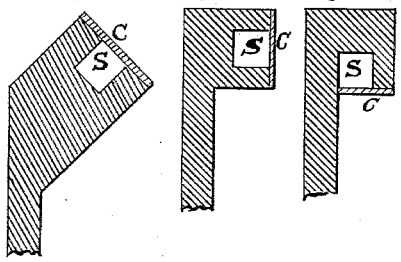

Figs. 4, 5, and 6 are sections of wheel-rims, showing different positions of the groove S.

Figure 7:
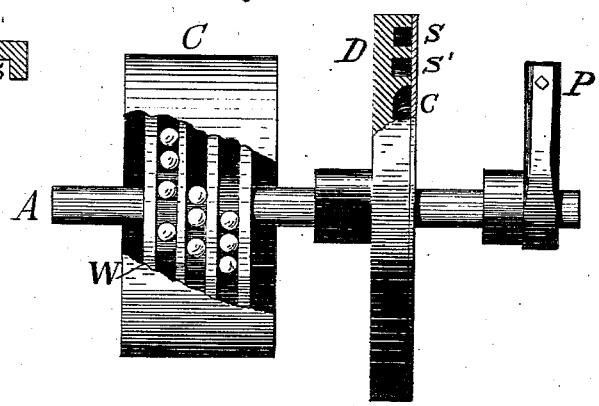

Fig. 7 shows a shaft having upon it a disk D, having two grooves in its face, and a pulley W, having three grooves in its rim, which act conjointly to counterbalance the tool-holder P upon the same shaft.

To use my invention, I place in the groove S a sufficient number of the balls b. More than a sufficient number will do no harm. I then fasten on the cover C, which keeps them in the groove.

The device will now operate as follows: When the machine is set in motion, the balls roll around in the groove until the friction against its sides brings them to the exact speed of the piece in which the groove is cut, when they will commence to revolve as though forming part of that piece if it is running perfectly true; but if it vibrates the groove which lies to that side of the shaft which springs outward will move faster than that upon the other. This, as a final result, moves the balls into a position where their centrifugal force just balances the force tending to vibrate the piece. A single ball if made of just the proper weight would take the proper balancing position; but by using several smaller balls I avoid all necessity of adjusting their weight, since they will take up such a position that the superfluous weight may be considered as divided into parts which balance each other. It is necessary that the counter-weights should be ready to take up a new position at the slightest vibration of the shaft. I therefore use for them smooth metal balls rolling in a smooth groove. Anything which is in this respect equivalent to the balls and groove may be substituted for them; but a counter-weight which is for any reason irregular and uncertain in its movements is worse than useless for the purposes of this invention.

When convenient, I prefer to cut the grooves in the surface of a heavy-rimmed wheel, as shown, and by so doing make a useful combination of a fly-wheel and self-adjusting counterpoise; but they may also be cut in any other revolving piece or in a separate piece attached thereto by bolts or screws. Whenever possible to do so, I prefer to cut the groove around the whole circumference; but when this cannot be done the groove may be limited to a part of it, if the weight of the balls is adjusted quite closely to the exact weight needed as a balance.

Having now described my invention and the manner of using it, I wish it understood that as my device is applicable to machinery of all sorts and is usable under widely-varying conditions I do not limit myself to the precise construction shown, but claim the right to make such changes and substitutions as would naturally suggest themselves to a person skilled in designing machinery who was called upon to adapt my invention to any particular piece of mechanism.

What I claim, and desire to secure by Letters Patent, is—

1. In combination with an unbalanced piece of mechanism mounted upon a horizontal shaft, a revolving piece having a continuous closed annular cavity concentric with the shaft, and one or more balancing-weights free to move in this cavity, all as set forth.

2. In a device for counterbalancing machinery, a revolving piece having in it a groove turned from the same line of centers as the shaft upon which it is mounted, one or more metal balls fitting loosely in this groove, and a cover for the groove, all in combination with each other and with the piece to be counterbalanced, substantially as set forth.

3. The combination, with a revolving tool-holder, of a fly-wheel of suitable dimensions to steady its motion when working, which has in its rim a groove concentric with the shaft, a plurality of metal balls rolling freely therein, and a cover therefor, all as and for the purpose set forth.

4. The combination, with a piece to be balanced, of one or more separate self-adjusting counter-balances mounted upon the same shaft, each of which consists of a wheel or disk having one or more grooves in its rim, a plurality of balls rolling freely therein, and a cover therefor, all as set forth.

GEORGE M. HERRICK.

Witnesses:
WESLEY C. KIMBALL,
H. C. BERRY.